W. B. WESCOTT.
CINEMATOGRAPHIC MULTIPLEX PROJECTION, &c.
APPLICATION FILED FEB. 20, 1917.

1,391,029.

Patented Sept. 20, 1921.
8 SHEETS—SHEET 1.

Inventor
William B. Wescott,
by Roberts, Roberts & Cushman
Attorneys.

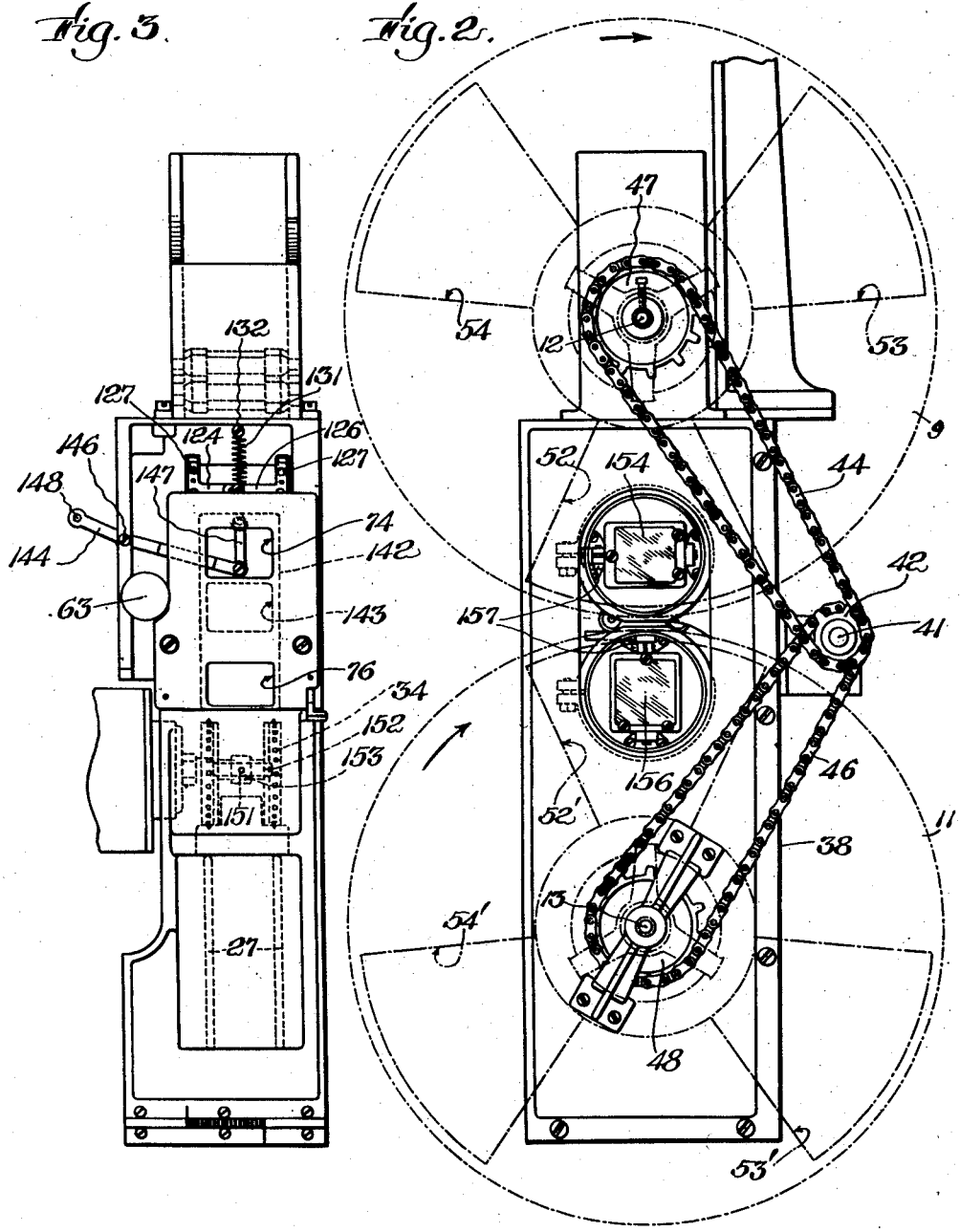

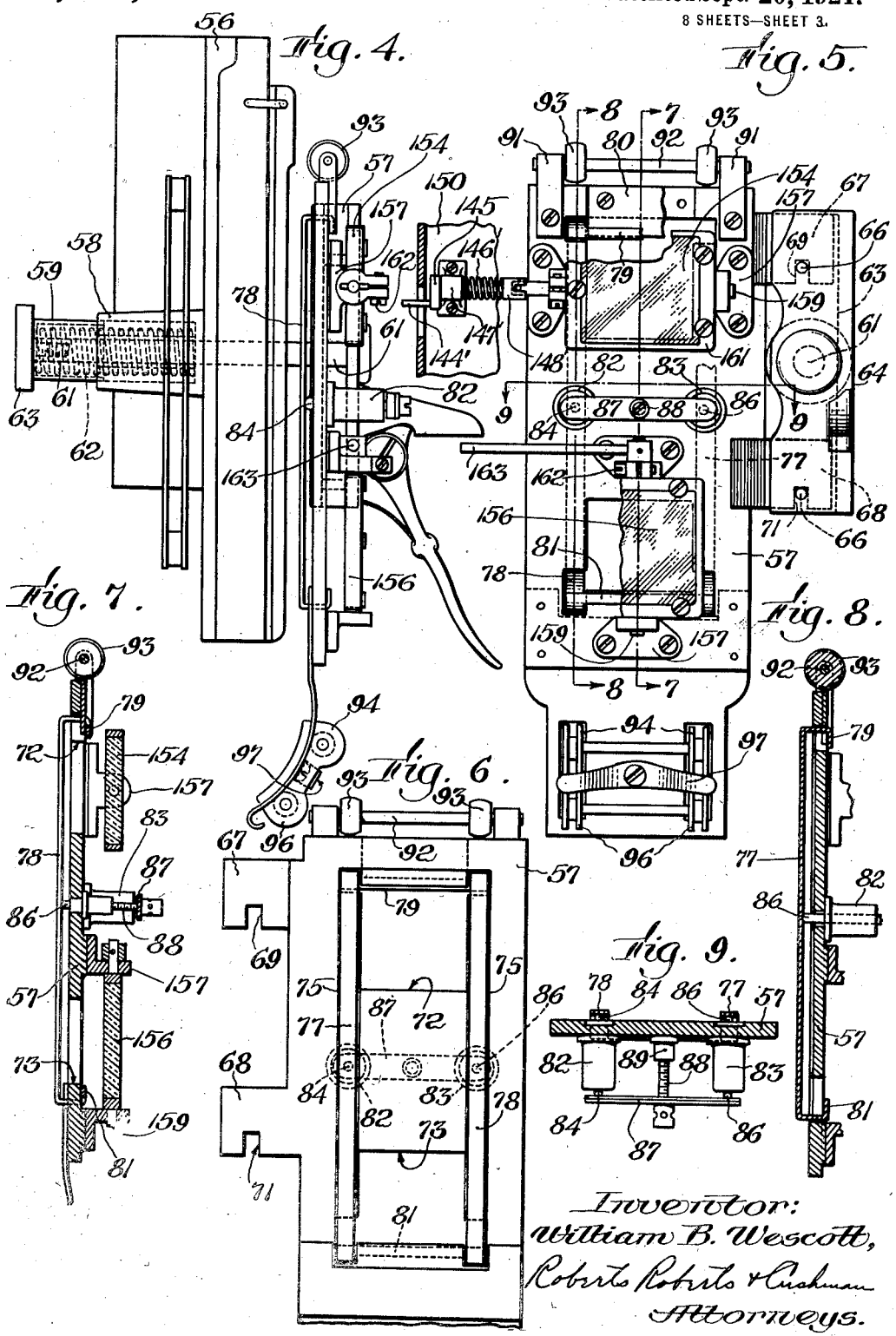

W. B. WESCOTT.
CINEMATOGRAPHIC MULTIPLEX PROJECTION, &c.
APPLICATION FILED FEB. 20, 1917.

1,391,029.  Patented Sept. 20, 1921.
8 SHEETS—SHEET 4.

Inventor:
William B. Wescott,
Roberts, Roberts & Cushman
Attorneys.

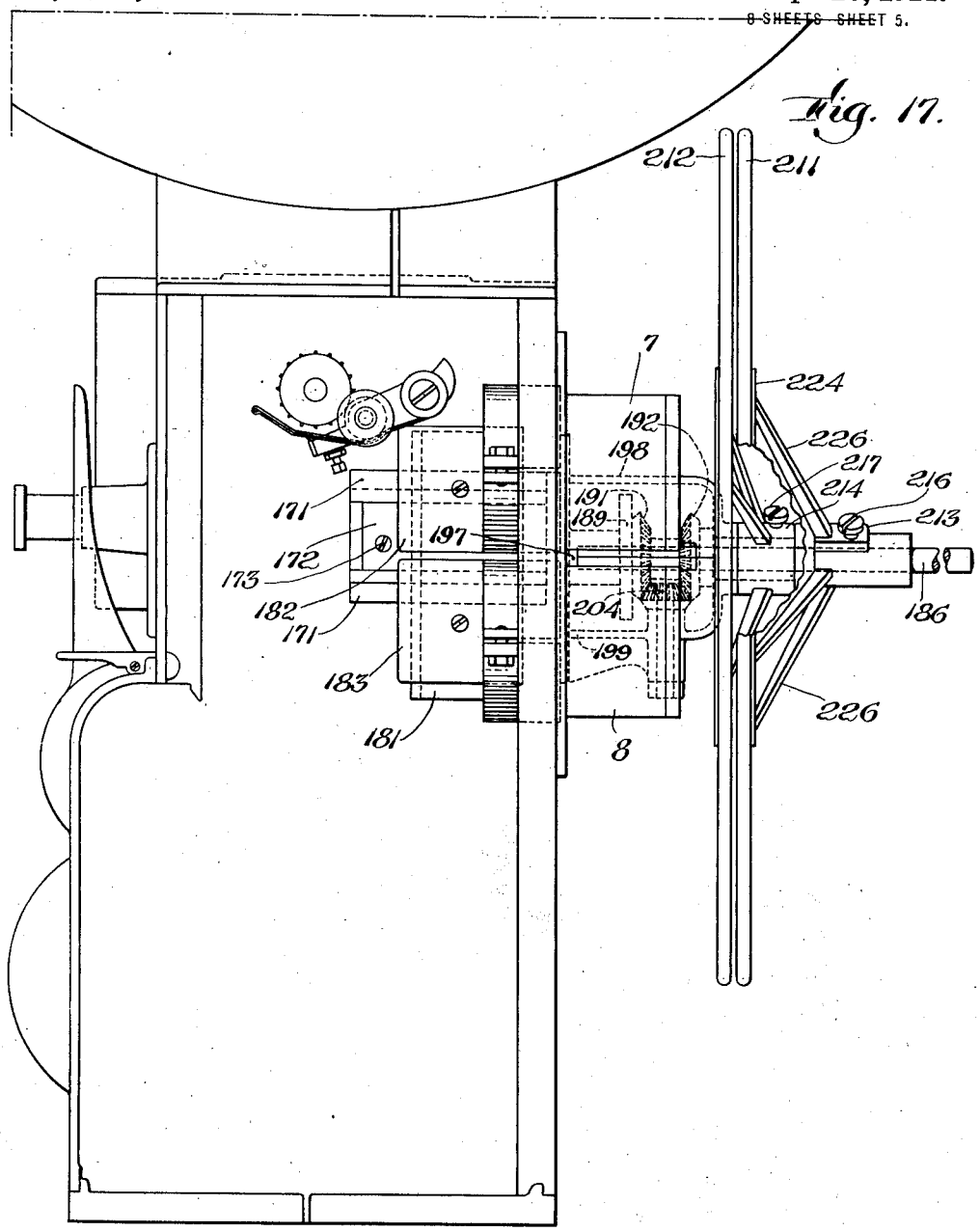

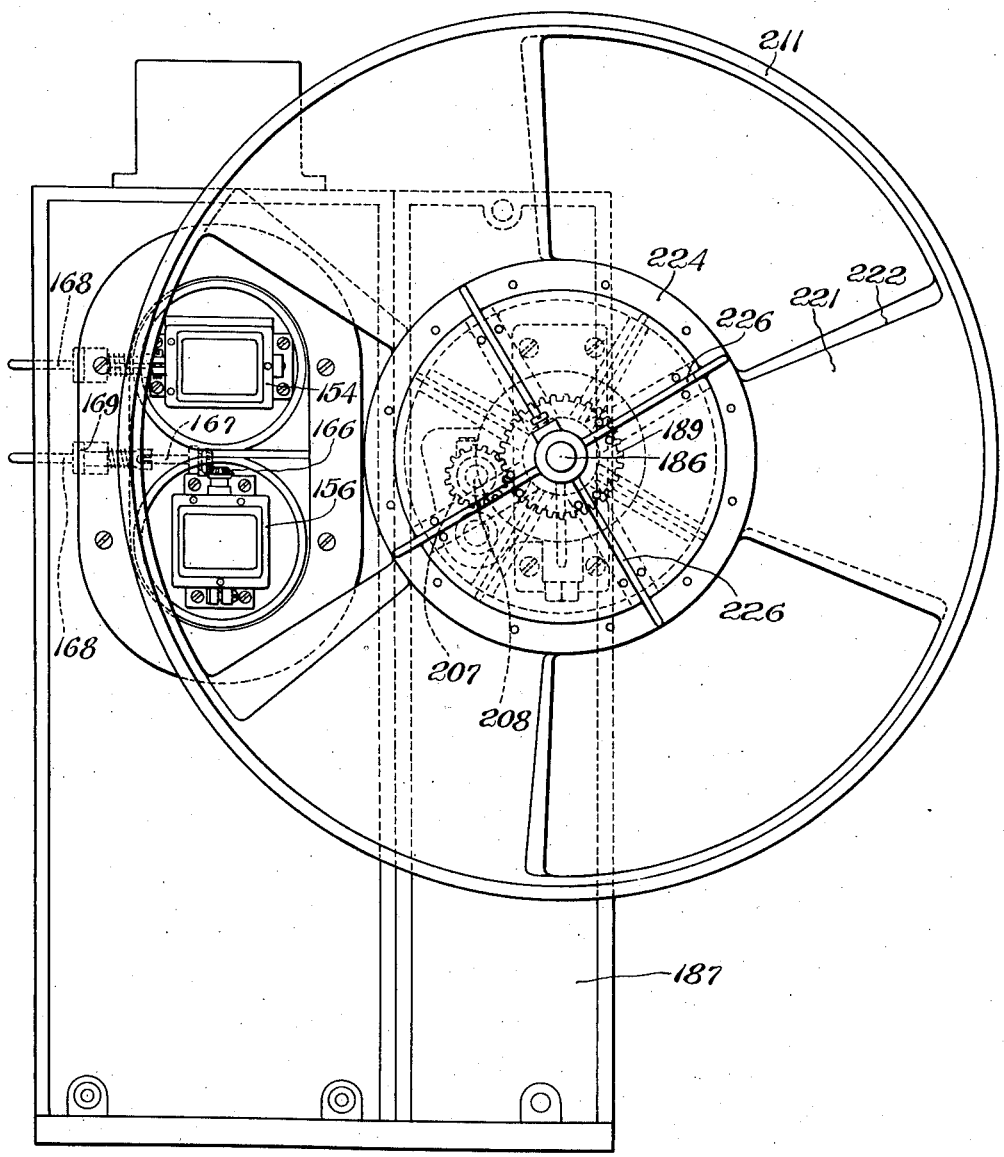

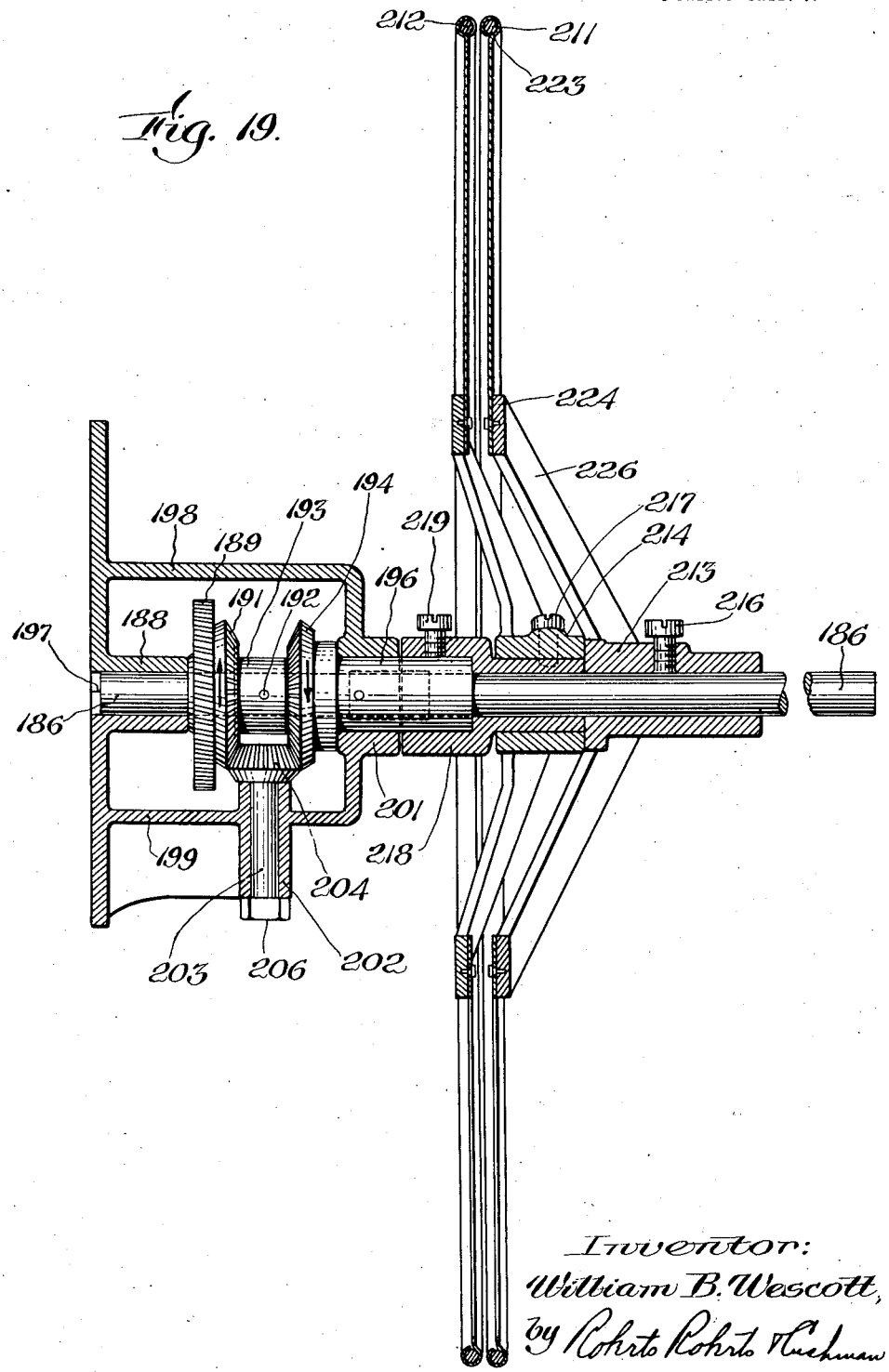

W. B. WESCOTT.
CINEMATOGRAPHIC MULTIPLEX PROJECTION, &c.
APPLICATION FILED FEB. 20, 1917.

1,391,029.

Patented Sept. 20, 1921.
8 SHEETS—SHEET 8.

Inventor:
William B. Wescott,
by Roberts Roberts & Cushman
Attorneys.

UNITED STATES PATENT OFFICE.

WILLIAM BURTON WESCOTT, OF WELLESLEY HILLS, MASSACHUSETTS, ASSIGNOR TO KALMUS, COMSTOCK & WESCOTT, INCORPORATED, OF BOSTON, MASSACHUSETTS, A CORPORATION OF MASSACHUSETTS.

CINEMATOGRAPHIC MULTIPLEX PROJECTION, &c.

1,391,029. Specification of Letters Patent. Patented Sept. 20, 1921.

Application filed February 20, 1917. Serial No. 149,791.

*To all whom it may concern:*

Be it known that I, WILLIAM BURTON WESCOTT, a citizen of the United States, and resident of Wellesley Hills, in the county of Norfolk and State of Massachusetts, have invented new and useful Improvements in Cinematographic Multiplex Projection, &c., of which the following is a specification.

This invention relates to cinematographic apparatus and more particularly to projection apparatus. The invention is herein illustrated as being embodied in apparatus for simultaneously projecting a plurality of complementary images in superposition upon a screen, thereby to produce color pictures, but in many of its aspects the invention is not limited in utility to multiple projection apparatus, nor indeed to projection apparatus of any kind. On the contrary, most of the subcombinations of the invention may be employed in camera apparatus or printing apparatus, and especially in printing apparatus of the character disclosed in the application of Daniel F. Comstock, Sr. No. 136,137, filed December 11, 1916, wherein the images are projected from the negative film to the positive film across an intervening space instead of being printed with the positive film in contact with the negative film. As showing the application of some of the features of this invention to camera apparatus, for example, reference is hereby made to my former application, Sr. No. 119,377, filed September 11, 1916.

The principal objects of this invention are to provide improved apparatus for simultaneously utilizing a plurality of images on a film, to provide a multiple film-gate the multiple parts of which function conjunctively, to provide means for adjustably mounting a portion of the optical system on the film-gate, to provide means for adjusting a plurality of lens systems both as a unit and individually, either longitudinally or transversely or both, whereby the images may be properly focused and properly positioned with relation to each other, and to provide improved shutter mechanism adapted to shutter one or more lens systems from opposite sides and arranged to be adjusted to and from the film-gate.

Other objects of the invention will be apparent from the following description read in the light of the accompanying drawings, in which,—

Fig. 2 is a front elevation of the embodiment shown in Fig. 1;

Fig. 3 is a rear elevation of the motion head shown in Fig. 1;

Fig. 4 is a right elevation of the film-gate, the film-gate trap or cover being shown in extended position;

Fig. 5 is a front elevation of the film-gate trap and support therefor, showing a broken portion of the motion head housing;

Fig. 6 is a rear elevation of the film-gate trap;

Fig. 7 is a vertical section of the film-gate taken on line 7—7 of Fig. 5;

Fig. 8 is a vertical section of the film-gate trap taken on line 8—8 of Fig. 5;

Fig. 9 is a horizontal section of the film-gate trap taken on line 9—9 of Fig. 5;

Figure 10:
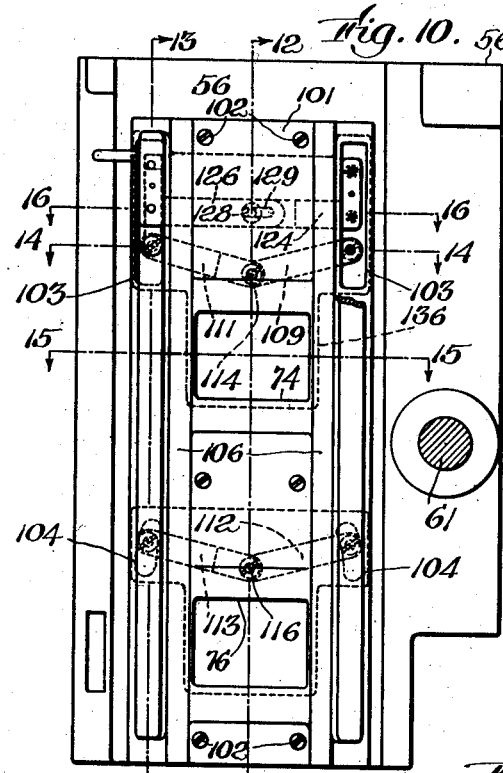
Fig. 10 is a front elevation of the film-gate with the trap removed, parts being broken away.
Figures 13, 14, 15, 16:
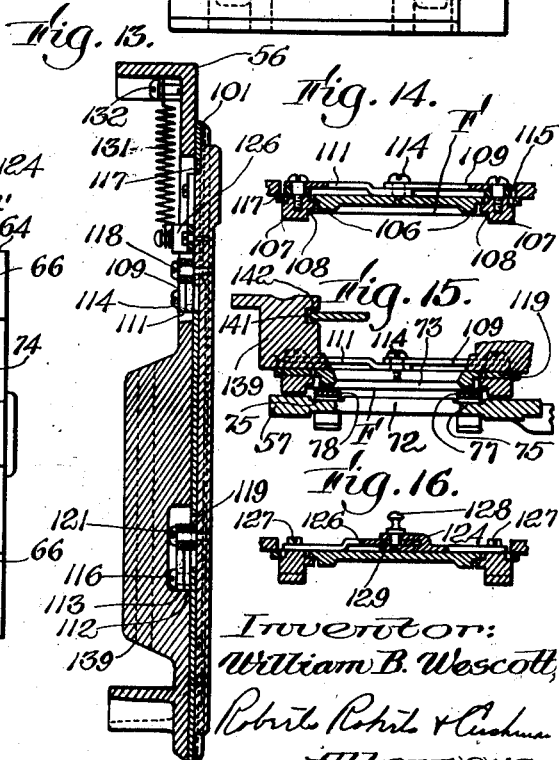
Fig. 13 is a vertical section of the film-gate taken on line 13—13 of Fig. 10.
Figure 21:
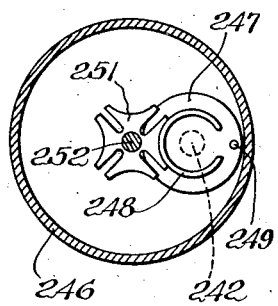
Figure 22:
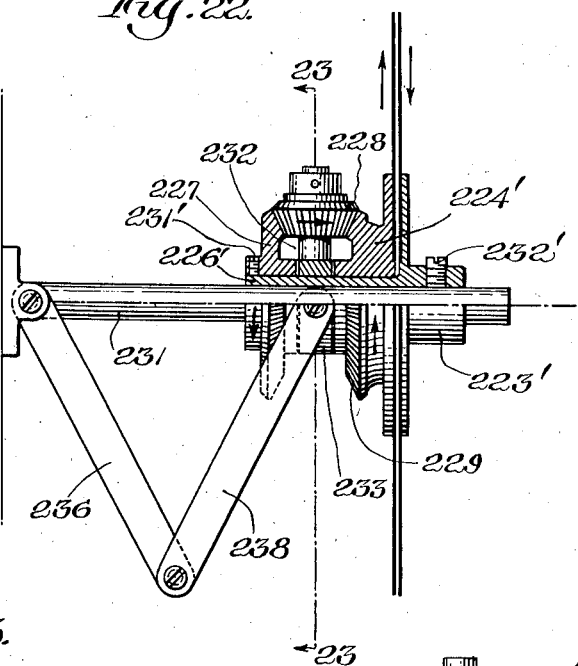
Figure 23:
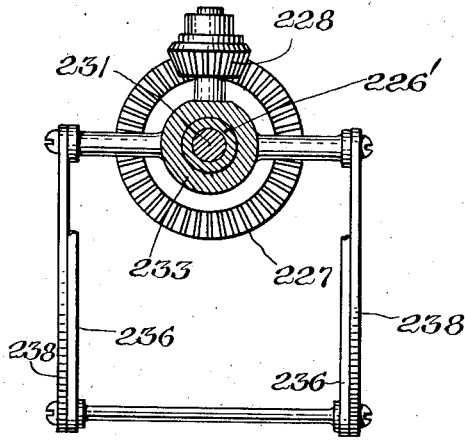
Figure 20:
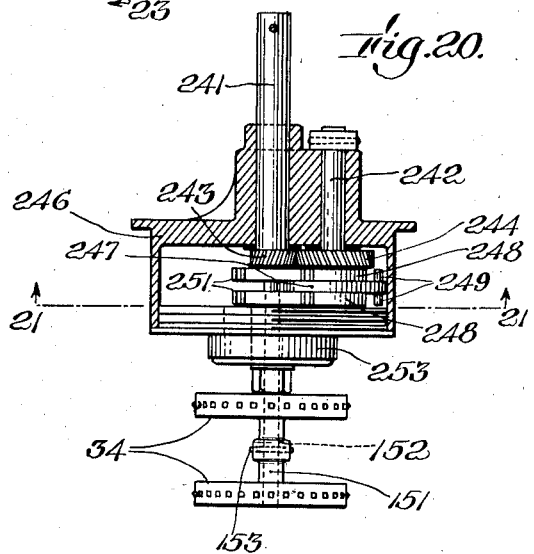

Figs. 14, 15 and 16 are horizontal sections of the film-gate taken on lines 14—14, 15—15, and 16—16, respectively, of Fig. 10;

Fig. 17 is a right elevation of another embodiment of the invention, parts being broken away or omitted;

Fig. 18 is a front elevation of the embodiment shown in Fig. 17, parts being omitted;

Fig. 19 is a longitudinal sectional view of the shutter mechanism shown in Figs. 17 and 18;

Fig. 20 is a horizontal sectional view of a Geneva movement, parts being shown in plan;

Fig. 21 is a vertical section of the Geneva movement taken on line 21—21 of Fig. 20;

Fig. 22 is in part a longitudinal section and in part a side elevation of a modified form of shutter mechanism; and Fig. 23 is a section of the modified shutter mechanism taken on line 23—23 of Fig. 22.

Figure 1:
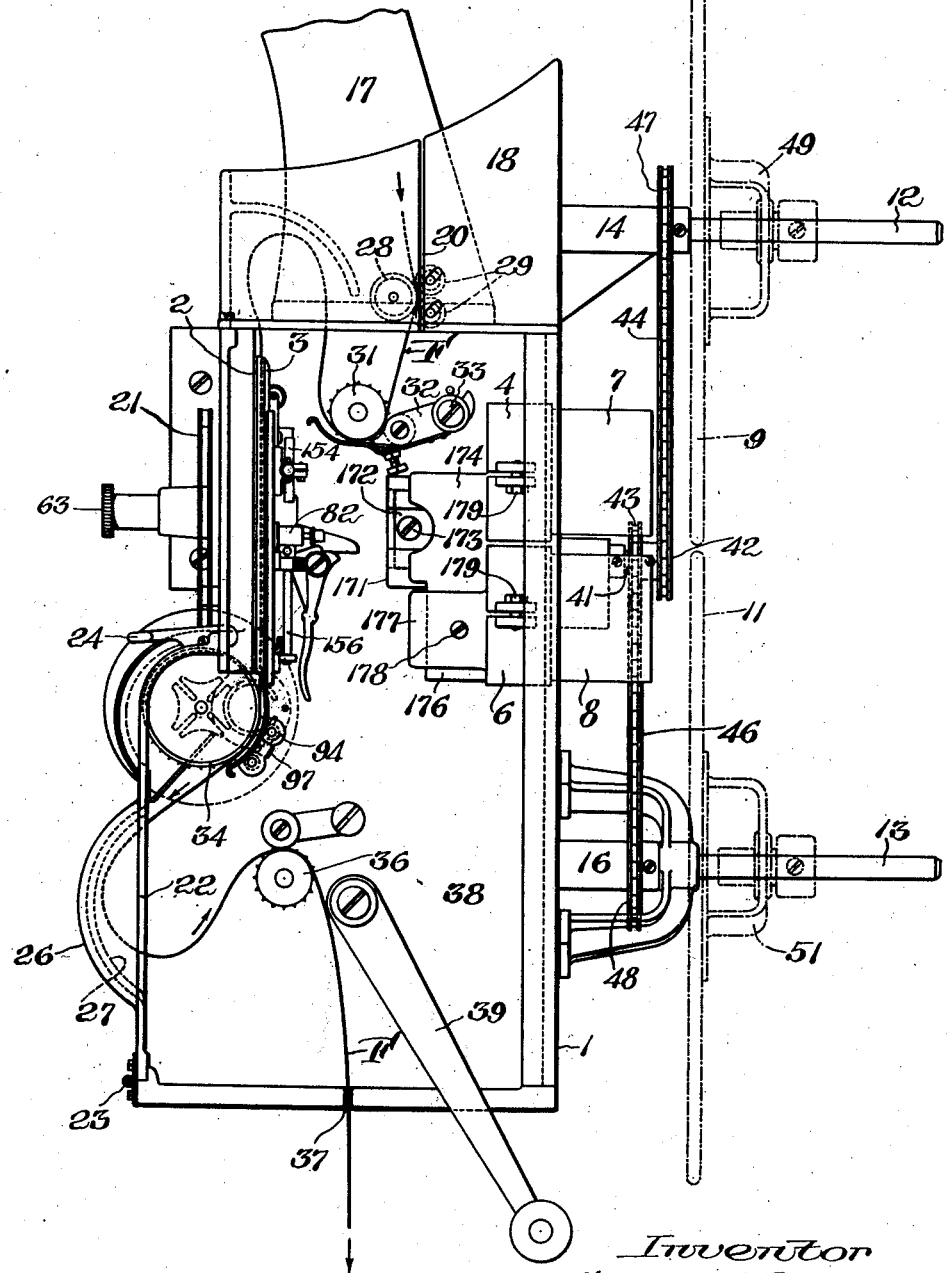
Figure 1 is a right elevation of one embodiment of the invention, parts being broken away and the right-hand side of the motion head housing being removed.

The embodiment of my invention shown in Fig. 1 comprises a motion head housing 1, the door of which has been removed, thus showing the film-gate 2, the film gate trap 3, the lens mounts 4 and 6, and other interior mechanism. Within the lens mounts 4 and 6, the lens tubes 7 and 8 are mounted in optical alinement with two image apertures in the film-gate, and in front of the respective lens tubes shutters 9 and 11 are mounted upon shafts 12 and 13, the shafts 12 and 13 being rotatably mounted upon the forward face of the motion head in bearings 14 and 16. At the top of the motion head the bracket 17 and frame 18 are provided to support the feed film magazine, the frame 18 having a slot 20 to permit the insertion of a film thereinto. At the rear of the motion head is provided a cooling plate 21 to prevent the film gate mechanism becoming unduly heated from the source of light (not shown). The lower portion 22 of the rear of the motion head housing is pivotally mounted at 23 so that it can be swung rearwardly and thereby give access to the interior of the head from the rear, a latch 24 being provided to engage the film gate and hold the member 22 in closed position. The central portion 26 of the member 22 is bowed outwardly to receive a loop of the film, and narrow ridges 27 are provided on the inside of portion 26 to engage the film near the edges, thereby preventing the film from being scratched along its central image-bearing portion.

The film F enters the motion head from the top between rollers 28 and 29, thence passes over sprocket wheel 31, being held in contact therewith by means of a guide member 32 pivotally mounted at 33. The film then passes to the film-gate, thence outwardly from the film-gate over a sprocket wheel 34 driven by my improved Geneva movement hereinafter described, thence over sprocket wheel 36 and thence passes through a slot 37 outwardly to the motion head take-up reel (not shown). The rollers 29 are mounted in angularly disposed slots so that they bear against the film and hold it in contact with the roller 28 by virtue of their own weight, and readily move away from the roller 28 when a splice or other enlargement of the film passes therebetween.

The motion head consists of two compartments, (Fig. 18) only the right-hand compartment of which is shown in Figs. 1, 2 and 3, the left-hand wall of the right-hand compartment being shown at 38 in Fig. 1. The transmission mechanism, not shown, is housed in the left-hand compartment, and the handle 39 for driving the transmission mechanism extends outwardly through the right-hand compartment as shown in Fig. 1. A shaft 41 extends forwardly from the left-hand compartment, as shown in Fig. 2, and upon the end of this shaft are mounted two sprocket wheels 42 and 43, these sprocket wheels coöperating with chains 44 and 46 for driving the respective shutters 9 and 11 through the medium of sprockets 47 and 48 mounted on the shafts 12 and 13 respectively.

The shutters 9 and 11, shown in dot and dash lines in Figs. 1 and 2, are mounted on the shafts 12 and 13 by means of brackets 49 and 51, and by virtue of the fact that they are directly connected to the same driving shaft 41, they are rotated in the same direction. However, this direction of rotation is not essential, the principal requirement being, in the particular embodiment of the invention herein disclosed, that the two lens systems be shuttered simultaneously. This is accomplished, in the mechanism illustrated in Figs. 1 and 2, by providing the respective shutters with corresponding openings 52, 52', 53, 53', 54, 54'. While three openings are shown in each shutter, this is not essential inasmuch as the film is advanced while each shutter passes across the paths of the lens systems from one opening to the next, but it is desirable to provide a plurality of openings disposed substantially symmetrically about the shutter so that the intervals between the successive projections of light to the screen are approximately equal inasmuch as this greatly reduces eye-strain in viewing the pictures. With this arrangement light is projected through each image at three successive times while the imagine is at rest in the film-gate, the projection of light being cut off between the intervals of light projection by means of the portions of the shutters disposed between the three openings.

The film-gate illustrated in detail on Sheets 3 and 4 comprises an integral casting 56 forming the upper portion of the rear wall of the motion head housing, and a film-gate trap 57 arranged to be reciprocated forwardly from the film-gate proper so that a film may be inserted between the film-gate and the film-gate trap. The means for moving the film-gate trap relatively to the film gate, as shown in Fig. 4, comprises a hollow tubular members 58 projecting rearwardly from the casting 56, a tubular plunger 59 fitting into the projection 58 a shaft 61 connected at one end to the head 53 of the plunger 59 and at the other end to the film-gate trap 57, the shaft 61 being surrounded by a coil compression spring 62 disposed within the tubular plunger 59. The spring 62 bears at one end against the head 63 and at the other end against the bottom of the hollow projection 58 so as normally to urge the plunger 59, shaft 61 and film-gate trap to the rear, thereby moving the film-gate trap into proximity to the film gate.

Figure 12:
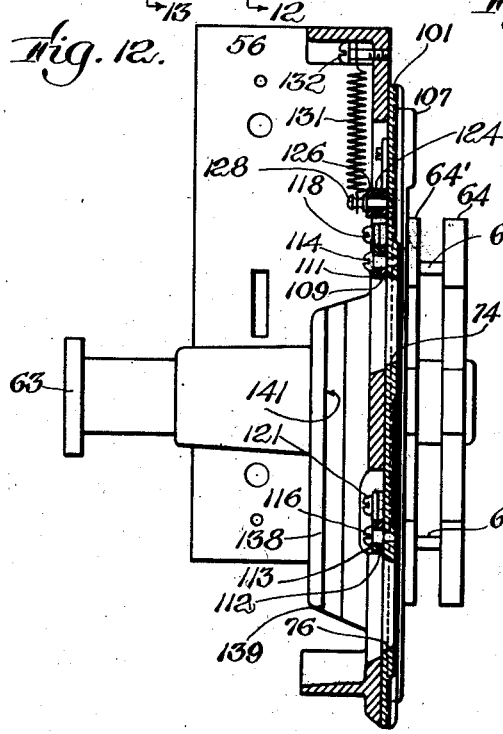
Fig. 12 is a vertical section of the film-gate taken on line 12—12 of Fig. 10.

The film-gate trap 57 is mounted on the forward end of shaft 61 in the following manner: Upon the forward end of the shaft 61 are mounted two plates 64' and 64 (Fig. 12) in spaced parallel relationship. Between these two plates extend two pins 66 near the upper and lower ends of the plates. Upon the left-hand side of the film-gate trap are mounted two extension members 67 and 68, (Figs. 5 and 6) these members having slots 69 and 71. The plates 64' and 64 are spaced apart just enough to receive the extension members 67 and 68 therebetween, and the slots 69 and 71 are so disposed with respect to the pins 66 as to fit over the pins when the extensions are inserted between the plates 64' and 64 and then depressed. Thus as the shaft 61 is reciprocated, the film-gate trap 57 is reciprocated therewith.

The film-gate trap, as illustrated in Figs. 6 to 9, consists of an integral plate 57 having image apertures 72 and 73 disposed in alinement with the image apertures 74 and 76 in the film-gate, the image apertures being spaced apart by approximately two picture spaces on the film, the apparatus being designed to be used with a film having the corresponding complementary images of the two series of images spaced apart by two picture spaces as disclosed in my former application Sr. No. 57,346, filed October 22, 1915, the particular apparatus herein disclosed being designed for two-color projection. On the rear face of the film-gate trap, on either side of the image apertures 72 and 73, are provided grooves 75 extending longitudinally in each direction somewhat beyond the image apertures. Within the grooves 75 are disposed two runners or presser members 77 and 78, these members being bent forwardly at their upper and lower ends respectively, as shown in Figs. 4, 7 and 8 and extending through slots in the film-gate trap where they are again bent inwardly and are joined together by crossmembers 79 and 81 (Fig. 5). The horizontal portions of the runners 77 and 78 disposed at their upper and lower ends are of such length as to permit the runners being moved toward and away from the film-gate trap. When the film-gate trap is in normal position, these runners bear against the forward side of the film near its edges, and not only maintain the film flat, but precisely position it longitudinally of the optical axis so that it cannot move forwardly and backwardly in the passage between the film-gate and the film-gate trap.

In order yieldingly to urge the runners against the film, the following mechanism is provided: Tubular members 82 and 83 (Fig. 7) are mounted on the forward side of the film-gate trap in the respective planes of the runners. Through these tubular projections and through openings in the film-gate trap pins 84 and 86 are arranged to reciprocate, these pins being yieldingly urged inwardly by means of one or more flat springs 87 engaging the forward ends of the pins and being mounted at the center on a member 88 threaded into a tubular projection 89 on the forward side of the film-gate trap, so that the tension of the spring 87 may be varied, thereby varying the force with which the runners 77 and 78 are urged against the film.

Upon the forward face of the film-gate trap at its upper end are provided two bearings 91 for supporting a shaft 92 upon which are mounted two rollers 93 in alinement with the runners 77 and 78. These rollers extend rearwardly somewhat beyond the face of the film-gate trap, so that the film is thereby guided into the film passage in the film-gate, and is prevented from engaging the film-gate trap. At the lower end of the film-gate trap are provided two slots 94 through which extend two presser members 96, these members being joined together and being normally urged through the slots by means of a spring 97, these presser members being provided yieldingly to maintain the film against the sprocket wheel 34 as illustrated in Fig. 1.

As shown on Sheet 4, the film-gate proper comprises a substantially flat member 101 mounted on the forward face of the casting 56 by means of screws 102. The film-gate is provided with image apertures 74, 76 hereinbefore referred to, and it is also provided with longitudinal slots 103 at each side of the film passage near its upper end and with arcuate slots 104 at each side of the film passage near its lower end. The forward side of the film-gate is provided with raised portions 106 substantially in opposition to the runners 77 and 78, so that the film is pressed against the raised portions 106 by means of the runners 77 and 78, as illustrated for example in Fig. 15, where F represents the film. On the outside of the raised portions 106 and in proximity thereto are provided two parallel guide members 107 having angular recesses 108 for engaging the edges of the film laterally to position the film in the film-gate. The guides 107 are pivotally mounted at their upper and lower ends by means of supporting arms 109, 111, 112 and 113, the supporting arms 109 and 111 being pivotally mounted upon the rear of the film-gate by means of a screw 114, and the supporting arms 112 and 113 being pivotally mounted upon the rear of the film-gate by means of a screw 116. Inasmuch as the parallel guides 107 are disposed on the forward side of the film-gate, while the supporting arms 109 to 113 are disposed upon the rear of the film-gate, the guide members 107 are provided near their upper ends with raised portions 117, these raised portions extending through the slots 103 and having their rearward faces disposed flush with the rear surface of the film-gate plate 101. Thus the supporting arms 109 and 111 may be pivotally connected with the guide members by means of screws 118, the arms 109 and 111 being spaced from the raised portions 117 by washers 115, (Fig. 14) or if turned over, bearing directly on the raised portions 117 of the guide members, the washers 115 then being omitted. Between the supporting arms 112 and 113 and the lower ends of the guide members are provided washers 119, so that in pivotally connecting the arms 112 and 113 to the guide members the screws 121 are passed through the supporting arms and thence through the washers and are then threaded into the guide members. The supporting arms 111 and 113 are offset intermediate their ends so that they may be lapped over the arms 109 and 112 at the pivots 114 and 116. The raised portions 117 on the rear of the guides are somewhat narrower than the slots 103, so that the raised portions may move laterally in the slots.

The guide members 107 are connected together at their upper ends in such manner that they may move laterally but not longitudinally with respect to each other. This connection comprises L-shaped members 124 and 126 secured to the raised portions 117 at their outer portions by means of screws 127, and being connected together at the center by means of a pin-and-slot connection comprising a pin 128 rigidly mounted in member 124 and fitting through a slot 129 in the member 126. As shown in Fig. 16, the member 124 is preferably provided with a flange at its inner end, the flange being so disposed that the member 126 fits between the flange and the member proper.

By virtue of the means for pivotally mounting the guides 107 and the means for preventing longitudinal movement of the guides with respect to each other, the guides are so arranged that they move in synchronism. The spring 131 extending between the pin 128 and the pin 132 mounted on the rear of the film gate normally urges the guide members upwardly. Owing to the pivotal supports 114 and 116, this upward movement causes the guides to move together. Conversely, as the guides are forced apart, they move downwardly as well as outwardly. Thus, as a film of varying size is passed through the film-gate, the guides automatically move inwardly and outwardly in accordance with variations in the width of the film. Owing to the fact that the guides are so connected together that they move in synchronism and at all times in parallelism, the film is maintained in accurate alinement with the image apertures throughout the entire length of the film-gate. This is a marked improvement over apparatus in which separate means is employed laterally to position the film at each film-gate aperture, and by employing guide mechanism of this character, both in the camera apparatus as disclosed in my prior application Sr. No. 119,377, in the printing apparatus, and in the projection apparatus, the films may be maintained in accurate lateral position while in the film-gates, so that substantially all lateral shifting of successive images on the screen is avoided.

Figure 11:
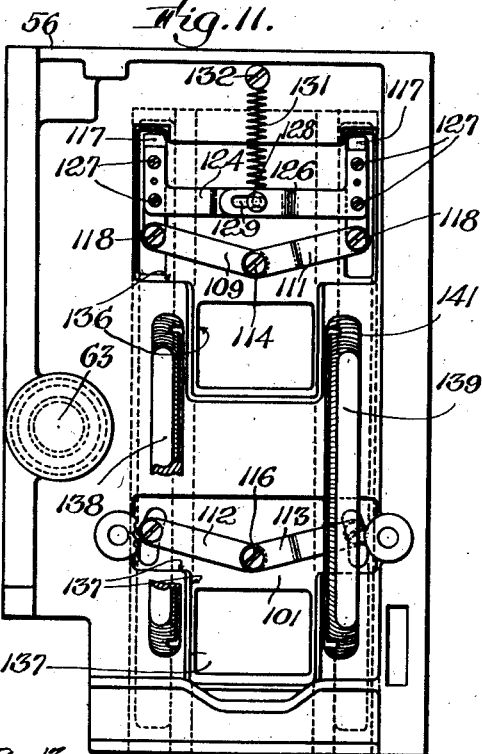
Fig. 11 is a rear elevation of the film-gate, parts being broken away.

The film-gate casting 56 to which the film-gate plate 101 is secured as above described is provided with an opening 136, (Fig. 11) which has a portion in alinement with the apertures 72 and 74 in the film-gate trap and film gate respectively, and an upper portion of somewhat wider extent which uncovers the rear upper portion of the film-gate plate 101 and the mechanism mounted thereon. The casting 56 is also provided with an opening 137 at its lower end, the lower portion of which is in alinement with the apertures 73 and 76 in the film-gate trap and film-gate respectively, and the upper portion of which uncovers the supporting arms 112 and 113 and other mechanism on the rear lower portion of the film-gate.

The casting 56 is also provided on its rear with elongated extensions 138 and 139, these extensions being disposed on opposite sides of the image apertures. On the inside of these elongated extensions are provided opposing slots 141 (Figs. 11 and 12) in which the fire screen 142 (Fig. 3) is adapted to slide vertically. The fire screen is substantially equal in length to the distance between the upper edge of the upper film-gate aperture 74 and the lower edge of the lower film-gate aperture 76, and is provided in the central portion with an aperture 143 of substantially the same dimensions as each of the film-gate apertures. The screen 142 is arranged to be moved longitudinally in the slots 141 by means of a lever arm 144 (Fig. 3) pivotally mounted on the motion head housing at 146, and pivotally connecting with the fire screen through a connecting link 147. The outer end of the lever 144 extends into the transmission compartment of the motion head (not shown) and at its extreme outer end is provided with an opening 148 adapting it to be connected to a governor arranged to move the outer end of the lever downwardly when the apparatus is in operation, and to allow the weight of the fire screen to move the lever into the position shown when the apparatus is at rest. Thus, when the apparatus is at rest, the fire screen covers the apertures 74 and 76 so that the film on the forward side of the screen is protected from the heat of the light source behind the screen; and when the apparatus is in operation, the fire screen is raised so that the aperture 143 registers with aperture 74 and the aperture 76 is uncovered by virtue of the lower end of the fire screen being raised above the aperture.

Another feature of this invention comprises mechanism for utilizing the invention disclosed in the patent to Daniel F. Comstock, No. 1,208,490, granted December 12, 1916, namely, the combination of auxiliary registering devices 154 and 156 with the film-gate, as illustrated on Sheets 1, 2 and 3. As described in the patent referred to, the auxiliary registering devices preferably comprise plates of glass or other refracting material having flat parallel faces, these refracting members being mounted in the paths of the respective image-bearing beams of light. One of these refracting members is mounted to rotate about a horizontal axis, while the other is mounted to rotate about a vertical axis. By tilting the refracting members with relation to the respective beams of light, the beams may be laterally shifted and the pictures thereby accurately registered on the screen.

In the present invention, the refracting members are mounted on the forward face of the film-gate trap, the upper member 154 being mounted to rotate about a horizontal axis, and the lower member 156 being mounted to rotate about a vertical axis. The mounting means comprises lugs 157 secured to the face of the film-gate trap by means of screws or other suitable means and having bearing portions disposed in perpendicular relationship to the film-gate trap. These perpendicular portions are provided with openings through which fit trunnions 159 mounted on the ends of the frames 161 which inclose the refracting members. In order to provide considerable friction between the rotating frames and the bearings, a split collar is preferably provided at one end of the frame, this collar being rigidly connected to the bearing, and having a screw 162 arranged to draw the two portions of the split collar together, thereby causing the collar to grip the trunnion of the frame 161 between the two portions thereof. By suitably adjusting the screws 162, the friction between the trunnions and bearings can be so adjusted as to maintain the refracting members in any adjusted position, and still permit easy adjustment thereof.

Suitable means for rotating the refracting members are shown in Fig. 5, for example, wherein the lower member is provided with a lever 163 mounted in the upper trunnion which is extended upwardly beyond the bearing therefor. The upper refracting member is arranged to be rotated by means of a handle 144' extending outwardly through a slot in the motion head housing. This handle is arranged to rotate the refracting member through the medium of a lever arm 145 and a shaft 146' rotatably mounted in a bearing 147'. The left-hand trunnion of the registering member is extended outwardly through its bearing and is provided at its end with a pin extending transversely therethrough. The inner end of the shaft 146' is provided with a slotted head 148' adapted to coöperate with the pin on the trunnion. The head 148' is slidingly mounted on the shaft 146', and a spring is provided normally to urge the head outwardly along the shaft, a stop being provided on the outer end of the shaft to limit the outward movement of the head 148'. The portion of the motion head housing 150 shown in Fig. 5 is preferably the door of the housing, which is arranged to swing away from the film-gate mechanism within the housing, and by virtue of the pin and slot connection the head 148' is withdrawn from the end of the trunnion when the door 150 is open. When the door is closed the slot in head 148 registers with the trunnion pin unless the head has been moved relatively to the pin while the parts are separated, in which event the end of the head engages the pin and the head is forced outwardly against the action of spring 146. However, when the shaft 146' is rotated by means of handle 144', the head 148' may be rotated until the slot registers with the pin, and the head 148' will then be advanced by the spring 146' to the position shown.

Instead of the mechanism shown in Fig. 5, the mechanism shown in Fig. 18 may be employed to rotate the registering devices 154 and 156. This mechanism consists of a set of bevel gears 166, one of which is mounted on the end of one of the trunnions of the registering device, and the other of which is mounted on the end of a shaft 167. The end of shaft 167 is arranged to coöperate, by means of a pin-and-slot connection such as shown in Fig. 5 or by other suitable means, with a shaft 168 rotatably mounted on the door of the motion head in a bearing 169, the shaft 168 extending outwardly through the door so that the mechanism may be operated from the exterior of the motion head. The upper registering device may be operated in a similar manner, except that the bevel gear connection is rendered unnecessary owing to the horizontal disposition of the trunnions of the upper device. Therefore, the upper shaft 168 may connect directly with the extended trunnion of the registering device similarly to the connection between shafts 167 and 168.

As shown in Figs. 1 and 17, the two lens tubes 7 and 8, which are respectively mounted in alinement with the upper and lower film-gate apertures, are arranged to be longitudinally adjusted and to be adjusted vertically with respect to each other. The means which I have illustrated for accomplishing this adjustment comprises dove-tail guides 171 mounted on the inner wall of the motion head housing and a dove-tail member 172 horizontally sliding in the dove-tail guides 171, a set screw 173 being provided in the member 172 to lock it with respect to the members 171. Upon the member 172 is mounted a member 174 having a downward extension 176 (Fig. 1). Upon this downward extension is slidingly mounted a member 177, a set screw 178 being provided to lock the member 177 with respect to the extension 176. Upon member 174 is mounted a split sleeve 4, a bolt 179 being provided to coöperate with the lugs on the split collar 4 in such manner as to grip the lens tube 7 within the collar 4. A similar collar 6 is mounted on member 177 for the purpose of supporting the lower lens tube 8. By loosening the bolts 179, the lens tubes 7 and 8 may be individually adjusted longitudinally. By loosening the set screw 178, the member 177, split collar 6 and lens tube 8 may be vertically adjusted on the member 176. And by loosening the set screw 173, the member 174 may be longitudinally adjusted in the guides 171, thereby longitudinally to adjust the lens tubes as a unit. While in Fig 1 only the lower lens tube is arranged to be vertically adjusted, in Fig. 17 both the upper and lower lens tubes are arranged to be vertically adjusted, the member 172 being provided with a vertical guide member 181 extending along both lens tubes, upon which are mounted the member 182 and 183 so as to be vertically adjustable, set screws being provided to hold these members in adjusted position.

In the modified embodiment of my invention illustrated in Figs. 17, 18 and 19, the two shutters are mounted concentrically upon a single shaft instead of being mounted on separate shafts as in Figs. 1 and 2. The shaft 186 upon which the shutters are mounted extends forwardly from the transmission compartment 187 of the motion head, (Fig. 18) and upon this shaft immediately in front of the bearing 188 (Fig. 19) formed integrally with the motion head housing is disposed a gear member comprising a spur gear 189 and a bevel gear 191, this gear member being secured to the shaft 186 by means of a pin 192 extending through the collar 193 forming a part of the gear member, and through the shaft 186. Surrounding the shaft 186 immediately in front of the collar 193 is another gear member comprising a bevel gear 194 and a collar 196 integral therewith. The housing is horizontally divided on the line 197 so that the bearing 188 may be separated along a horizontal plane to permit the insertion of shaft 186. The upper and lower portions of the motion head housing are also provided with extensions 198 and 199 terminating at their outer ends in a bearing 201, also divided along a horizontal plane through the axis of shaft 186. Thus the shaft 186 is directly supported by bearing 188 on one side of the gearing, and is indirectly supported through the medium of the tubular shaft 196 upon bearing 201 on the other side of the gearing, and inasmuch as the bearings 188 and 201 are integral, the shafting is maintained in accurate alinement.

In the extension 199 is provided a vertical bearing 202 in which is mounted a shaft 203 having a bevel gear 204 on its upper end coöperating with the bevel gears 191 and 194, the shaft 203 being maintained in position by means of a nut 206 threaded on the lower end thereof. The gear member 189—191 is arranged to be driven by means of a gear 207 mounted on shaft 208 disposed in parallelism with the shaft 186, the gear 207 meshing with gear 189. Thus, when power is supplied to shaft 208, the gear member 189—191 is rotated in one direction, for example in a counterclockwise direction, while the gear member 194—196 is rotated through the medium of the idler gear 204 in the opposite direction, for example in a clockwise direction.

The shutters 211, 212 are mounted respectively on the shafts 186 and 196 through the medium of collars 213 and 214. The collar 213 fits over shaft 186 and is held in position by means of a set screw 216. The collar 214 may be mounted directly on the shaft 196 and secured thereto by means of the set screw 217, or it may be mounted indirectly on the shaft 196 through the medium of an auxiliary collar 218 as shown in Fig. 19. This auxiliary collar consists of two portions, the left-hand portion fitting over the shaft 196 and carrying a set screw 219 for securing it to the shaft, while the right-hand portion of the sleeve is of smaller diameter, its size being such that it fits over the shaft 186 and into the sleeve 214. I preferably make the outer diameter of the smaller portion of collar 218 equal to the outer diameter of shaft 196 so that the sleeve 214 will fit over either the smaller portion of collar 218 or over the shaft 196. This affords means for adjusting the position of the shutters longitudinally of the shaft 186 and therefore longitudinally of the optical system, this being rendered desirable by virtue of the necessity of adjusting the lens systems forwardly and backwardly to suit the apparatus to various projecting distances. For example, when the lens systems are in retracted position, as illustrated in Fig. 17, for example, the collar 218 may be removed and the sleeve 214 mounted directly on the shaft 196. On the other hand, when the lens systems are in advanced position as illustrated, for example, in Fig. 1, the sleeve 218 may be employed in order to position the shutters farther in front of the motion head.

In either position of the shutters, the shutter 212 is driven by gear 194 in a clockwise direction, while the shutter 211 is driven by gear 191 in a counterclockwise direction, whereby the lens systems are shuttered from opposite sides. This is not only of utility in shuttering a plurality of lens systems, such as employed by the apparatus herein disclosed, but its is also of marked advantage in connection with a single lens system, inasmuch as the shuttering takes place simultaneously from opposite sides, thereby reducing the shuttering interval by one-half. Furthermore, the space occupied by the apparatus carrying concentric shutters is much less than that occupied by the apparatus illustrated in Figs. 1 and 2. The elimination of the chain and sprocket drive is also an advantage for most purposes.

The specific construction of the shutters shown in Figs. 17 to 19, comprises a flat annular stamping 221 having three openings 222, disposed symmetrically thereabout, and being turned over a ring 223 of wire or other suitable material at its outer periphery. At its inner periphery it is mounted on the annular ring 224, being supported on sleeve 213 (or 214) by means of radial arms 226.

A modified construction of the shutter mechanism is shown in Fig. 22, wherein power is transmitted to the shutters directly through shaft 231, corresponding to shaft 186 in Figs. 17 to 19. The forward shutter is directly connected to shaft 231 by means of set-screw 232′ passing through collar 233. The rearward shutter is mounted on collar 224′, which rotates on the rearward portion 226′ of collar 223′. Power is transmitted from the shaft 231 to the collar 224′ through the medium of bevel gears 227, 228 and 229, the gear 227 being rigidly connected to the collar 226′ by means of set-screws 231′, and the gear 229 being formed integrally with the collar 224′. The idler gear 228 disposed between the gears 227 and 229 is mounted on a shaft 232 which, in turn, is mounted on a collar 233 surrounding the collar 226′ intermediate the gears 227 and 229. As indicated by the arrows, when the gear 227 is driven in a clockwise direction by means of shaft 231, thereby driving the forward shutter in a clockwise direction, the gear 229 is rotated in a counterclockwise direction through the intermediate gear 228, thereby driving the rearward shutter in a counterclockwise direction.

In order to prevent the idler gear 228, shaft 232 and collar 233 from rotating with the shaft 231, the link mechanism comprising link 236 and link 238 is provided, the link 236 being pivotally connected to the forward face of the motion head and the link 238 being pivotally connected to the collar 233, the lower ends of links 236 and 238 being pivotally connected together. This arrangement not only prevents the rotation of the gear mechanism as a whole, but it permits the adjustment of the gear mechanism and shutters longitudinally of the shaft 231. For example, by loosening the screws at the ends of the link members 236 and 238 and at the same time loosening set screw 232′, the gear and shutter mechanism may be bodily moved along the shaft 231; and by tightening the screws at the ends of the link members, the mechanism is firmly held in adjusted position.

In Figs. 20 and 21 I have illustrated improved mechanism for intermittently advancing the film through the film-gate a plurality of picture spaces at a time, this increased advancement being necessary in apparatus of this character wherein the film carries two series of complementary images. The apparatus herein disclosed is intended to be used with a film in which the corresponding images of the two series of complemental images are spaced two picture spaces apart, but the film advancing means may be the same irrespective of the relative disposition of the complemental images. When advancing the film two picture spaces at a time, the motion of the intermittent transmission mechanism is the same as for single pictures inasmuch as the interval of time during which the lens systems are shuttered is the same, but the peripheral velocity of the sprocket must be twice as great and the stress much greater. I have accordingly provided intermittent transmission mechanism of the Geneva type which will satisfactorily withstand the increased stress resulting from the increased amount of film advancement. Inasmuch as this improved transmission mechanism forms the subject matter of my application Sr. No. 139,762, filed December 30, 1916, I will here only set forth its general structure, which is as follows:

The shaft 241 is continuously rotated by suitable means, and this continuous rotation is transmitted to shaft 242 through the medium of spur gears 243 and 244, the housing 246 being provided with suitable bearings for the two shafts. On the end of shaft 242 is mounted a pin wheel 247 carrying a mutilated ring 248 on either side thereof, and carrying a pin 249 which extends through the pin wheel and outwardly therefrom on opposite sides. Coöperating with the pin wheel is a Geneva wheel 251 which is mounted on the inner end of a shaft 252, the shaft 252 extending outwardly through a suitable bearing in the cap 253 threaded into the housing 246. On the outer end of shaft 252 is mounted the sprocket wheel 34 (also see Figs. 1 and 3) which is intermittently rotated by the Geneva movement at the proper frequency and through the proper angles to advance the film through the film-gate two spaces at a time in synchronism with the shutters.

The two parts of the sprocket wheel 34 are joined together by means of a hollow tubular shaft 151, the hollow tubular shaft being adapted snugly to fit over the driving shaft 152. The most suitable means of rigidly connecting the hollow tubular shaft 151 to the shaft 152 comprises a pin passing through the tubular shaft 151 and the shaft 152, and owing to the small diameter of the shaft 152, the pin 153 must be made of relatively small diameter. This construction has involved considerable wear between the pin and the tubular shaft 151, and after a short while it has been found that there is considerable lost motion between the tubular shaft and the inner shaft due to the increased size of the pin opening in the tubular shaft. I therefore propose to enlarge the tubular shaft 151 in the region of the pin 153. This enlargement may either extend entirely around the shaft 151 as illustrated, or it may merely surround the pin 153 in the form of an annular projection on either side of the shaft. This provides an increased bearing surface between the pin and the outer shafts so that the lost motion above referred to is eliminated and the sprocket wheel may be maintained in fixed position on the shaft indefinitely.

The operation of the apparatus will be apparent from the above detailed description. The film is intermittently advanced through the film-gate in such manner that complementary images are presented to the respective image apertures of the film-gate simultaneously, and these complementary images are projected on to the screen through the registering devices 154 and 156, thence through the lens systems in the lens tubes 7 and 8 respectively, and through the color screens, which are not shown but which may conveniently be located in the forward ends of the lens tubes 7 and 8, and thence upon the screen in superposition. In the event that the complementary images do not exactly register on the screen, the auxiliary registering devices 154 and 156 may be so adjusted as to bring the images into register. By rotating the upper registering device 154, the image projected through the upper lens system is vertically shifted on the screen. By rotating the lower registering device about its vertical axis, the image projected by the lower lens system may be horizontally shifted, and by suitably shifting either one or both images, they can readily be brought into coincidence.

I claim:

1. Cinematographic apparatus comprising a film passage having a plurality of picture apertures in longitudinal alinement therealong, runners engaging one side of the film near the edges throughout the region of the apertures, and means intermediate the apertures for yieldingly urging the runners against the film, thereby to maintain the film against one side of the film passage throughout the said region.

2. Cinematographic apparatus comprising a film passage having a plurality of picture apertures in longitudinal alinement therealong, runners engaging one side of the film near the edges throughout the region of the apertures, and means extending through the wall of the film passage intermediate the apertures for yieldingly urging the runners against the film, thereby to maintain the film against one side of the film passage throughout the said region.

3. Cinematographic apparatus comprising a film-gate having a series of longitudinally spaced apertures, and a fire screen for the film gate, the fire screen having substantially the same longitudinal extent as the series of apertures and having one or more openings therein, the number of openings being one less than the number of apertures, and the openings being so disposed that in one position of the screen the apertures are uncovered while in another position the apertures are covered.

4. Cinematographic apparatus comprising a film-gate having an image aperture therein, a housing for said film-gate having an opening in one side, a cover for said opening, a device in optical alinement with said aperture for deflecting light, and means for adjusting said device, said means including portions mounted in the housing and on said cover respectively and arranged to interengage when the cover is closed and to disengage when the cover is opened.

5. Cinematographic apparatus comprising an inner shaft, an outer tubular shaft surrounding the inner shaft, the end of the inner shaft extending outwardly beyond the end of the outer shaft, forward and rearward shutters for the inner and outer shafts respectively, a sleeve for mounting each shutter on its shaft, and an extension sleeve having portions of different diameters, one portion fitting over the end of the outer shaft, and the other portion fitting into the sleeve of the rearward shutter.

6. Cinematographic apparatus comprising an inner shaft, an outer tubular shaft surrounding the inner shaft, the end of the inner shaft extending outwardly beyond the end of the outer shaft, forward and rearward shutters for the inner and outer shafts respectively, a sleeve for mounting each shutter on its shaft, and an extension sleeve having portions of different diameter, one portion fitting over the end of the outer shaft, and the other portion fitting into the sleeve of the rearward shutter, the outer diameter of the latter portion being substantially equal to the outer diameter of the outer shaft so that the rearward shutter may be mounted either directly on the outer shaft or indirectly thereon through the extension sleeve, thereby suitably to position the shutter longitudinally of the shaft.

Signed by me at Jacksonville, Florida, this thirty-first day of January, 1917.

WILLIAM BURTON WESCOTT.

Witnesses:
JESSIE C. BROWN,
J. J. MURRAY.